United States Patent
Oshita et al.

(10) Patent No.: US 11,773,762 B2
(45) Date of Patent: Oct. 3, 2023

(54) TUBULAR MEMBER FOR EXHAUST GAS TREATMENT DEVICE AND EXHAUST GAS TREATMENT DEVICE USING THE TUBULAR MEMBER, AND METHOD OF MANUFACTURING TUBULAR MEMBER FOR EXHAUST GAS TREATMENT DEVICE

(71) Applicant: NGK INSULATORS, LTD., Nagoya (JP)

(72) Inventors: Yusuke Oshita, Nagoya (JP); Kisuke Yamamoto, Kuwana (JP); Takahiro Tomita, Chita (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/644,369

(22) Filed: Dec. 15, 2021

(65) Prior Publication Data
US 2022/0275744 A1  Sep. 1, 2022

(30) Foreign Application Priority Data
Feb. 26, 2021 (JP) ................. 2021-030172
Oct. 11, 2021 (JP) ................. 2021-167045

(51) Int. Cl.
| | |
|---|---|
| F01N 3/20 | (2006.01) |
| C03C 3/064 | (2006.01) |
| B01J 35/04 | (2006.01) |
| B01D 53/94 | (2006.01) |
| F01N 3/28 | (2006.01) |
| F01N 13/14 | (2010.01) |
| F01N 13/10 | (2010.01) |

(52) U.S. Cl.
CPC .......... *F01N 3/2026* (2013.01); *B01D 53/94* (2013.01); *B01J 35/04* (2013.01); *C03C 3/064* (2013.01); *F01N 3/2853* (2013.01); *F01N 3/2857* (2013.01); *F01N 3/2864* (2013.01); *F01N 3/2871* (2013.01); *F01N 13/102* (2013.01); *F01N 13/14* (2013.01); *F01N 13/148* (2013.01); *F01N 2260/08* (2013.01); *F01N 2330/04* (2013.01); *F01N 2330/10* (2013.01); *F01N 2330/102* (2013.01); *F01N 2510/02* (2013.01)

(58) Field of Classification Search
CPC combination set(s) only.
See application file for complete search history.

(56) References Cited

U.S. PATENT DOCUMENTS

| | | | |
|---|---|---|---|
| 6,245,301 B1 * | 6/2001 | Stroom | ............ F01N 3/0211 428/920 |
| 8,784,741 B2 | 7/2014 | Yoshioka et al. | |

(Continued)

FOREIGN PATENT DOCUMENTS

| | | |
|---|---|---|
| JP | 2012-154316 A | 8/2012 |
| JP | 5408341 B2 | 2/2014 |

*Primary Examiner* — Binh Q Tran
(74) *Attorney, Agent, or Firm* — BURR PATENT LAW, PLLC

(57) ABSTRACT

A tubular member for an exhaust gas treatment device according to at least one embodiment of the present invention includes: a tubular main body made of a metal; and an insulating layer formed at least on an inner peripheral surface of the tubular main body. The insulating layer contains glass containing a crystalline substance, and the insulating layer has a porosity of from 1% to 12%.

13 Claims, 3 Drawing Sheets

(56) References Cited

U.S. PATENT DOCUMENTS

| | | | |
|---|---|---|---|
| 2004/0079060 A1* | 4/2004 | Alward | C04B 35/6316 |
| | | | 55/523 |
| 2007/0065349 A1* | 3/2007 | Merry | C03C 3/083 |
| | | | 422/179 |
| 2007/0151799 A1* | 7/2007 | Zuberi | F01N 13/10 |
| | | | 181/240 |
| 2010/0150791 A1* | 6/2010 | Kunze | C04B 41/89 |
| | | | 422/179 |
| 2013/0025267 A1 | 1/2013 | Yoshioka et al. | |
| 2016/0115843 A1* | 4/2016 | Mutsuda | F01N 3/2066 |
| | | | 60/300 |
| 2017/0260887 A1* | 9/2017 | Takase | B01J 35/023 |
| 2019/0078477 A1* | 3/2019 | Hatakeyama | B01J 35/04 |

* cited by examiner

TUBULAR MEMBER FOR EXHAUST GAS TREATMENT DEVICE AND EXHAUST GAS TREATMENT DEVICE USING THE TUBULAR MEMBER, AND METHOD OF MANUFACTURING TUBULAR MEMBER FOR EXHAUST GAS TREATMENT DEVICE

BACKGROUND OF THE INVENTION

This application claims priority under 35 U.S.C. Section 119 to Japanese Patent Application Nos. 2021-030172 filed on Feb. 26, 2021 and 2021-167045 filed on Oct. 11, 2021 which are herein incorporated by reference.

1. Field of the Invention

The present invention relates to a tubular member for an exhaust gas treatment device and an exhaust gas treatment device using the tubular member, and a method of manufacturing a tubular member for an exhaust gas treatment device.

2. Description of the Related Art

In recent years, there has been proposed an electric heating catalyst (EHC) in order to relieve a decrease in exhaust gas purification performance immediately after starting an engine. The EHC has a configuration in which electrodes are arranged on a honeycomb structure formed of conductive ceramics, and the honeycomb structure itself is caused to generate heat by energization, to thereby increase the temperature of a catalyst supported by the honeycomb structure to an activating temperature before starting an engine or at the time of starting the engine.

The EHC is typically accommodated in a tubular member (sometimes referred to as "can") made of a metal to form an exhaust gas treatment device. The EHC improve exhaust gas purification efficiency at the time of starting a vehicle by energization as described above, but electric leakage from the EHC to an exhaust pipe may occur to decrease the purification performance. In order to solve such problem, there has been known a technology for preventing electric leakage by forming an insulating layer (typically containing a glass component) on an inner peripheral surface of the can (Japanese Patent No. 5408341 and Japanese Patent Application Laid-open No. 2012-154316).

SUMMARY OF THE INVENTION

According to the technologies described in Japanese Patent No. 5408341 and Japanese Patent Application Laid-open No. 2012-154316, the insulating layer may be softened and deformed under high temperature caused by an exhaust gas to lose an insulating function. In addition, the retention of the EHC may become insufficient due to the deformation of the insulating layer, with the result that an exhaust gas purification function may not be stable. Further, the insulating layer may be peeled from the inner peripheral surface of the can.

A primary object of the present invention is to provide a tubular member for an exhaust gas treatment device that includes an insulating layer, which has excellent adhesiveness to a tubular main body, which can maintain an insulating function without being softened and deformed even under high temperature, and in which the occurrence of cracking is suppressed even under high temperature, and that can stably maintain an exhaust gas treatment function even under high temperature. A further object of the present invention is to provide an exhaust gas treatment device using such tubular member, and a method of manufacturing a tubular member for an exhaust gas treatment device.

A tubular member for an exhaust gas treatment device according to at least one embodiment of the present invention includes: a tubular main body made of a metal; and an insulating layer formed at least on an inner peripheral surface of the tubular main body. The insulating layer contains glass containing a crystalline substance, and the insulating layer has a porosity of from 1% to 12%.

In at least one embodiment, the insulating layer contains a pore, which is prevented from being brought into contact with an interface between the insulating layer and the tubular main body, and which has a maximum size of 50 μm or less.

In at least one embodiment, the insulating layer has a porosity of from 1% to 6% in a range of from the interface between the insulating layer and the tubular main body to 50 μm of the insulating layer.

In at least one embodiment, the insulating layer contains a pore, which is brought into contact with an interface between the insulating layer and the tubular main body, and which has a maximum size of 30 μm or less.

In at least one embodiment, the glass contains silicon, boron, and magnesium.

In at least one embodiment, the insulating layer has a thickness of from 50 μm to 800 μm.

According to one of other aspects, there is provided an exhaust gas treatment device. The device includes: an electric heating catalyst support capable of heating an exhaust gas; and the tubular member for an exhaust gas treatment device as described above, which is configured to accommodate the electric heating catalyst support.

According to one of other aspects, there is provided a method of manufacturing a tubular member for an exhaust gas treatment device including a tubular main body made of a metal and an insulating layer formed at least on an inner peripheral surface of the tubular main body. The method includes: preparing a tubular main body; and forming an insulating layer on an inner peripheral surface of the tubular main body. The insulating layer contains glass containing a crystalline substance, and the insulating layer has a porosity of from 1% to 12%.

DESCRIPTION OF THE EMBODIMENTS

Embodiments of the present invention are described below with reference to the drawings. However, the present invention is not limited to these embodiments.

A. Tubular Member for Exhaust Gas Treatment Device

Figure 1:
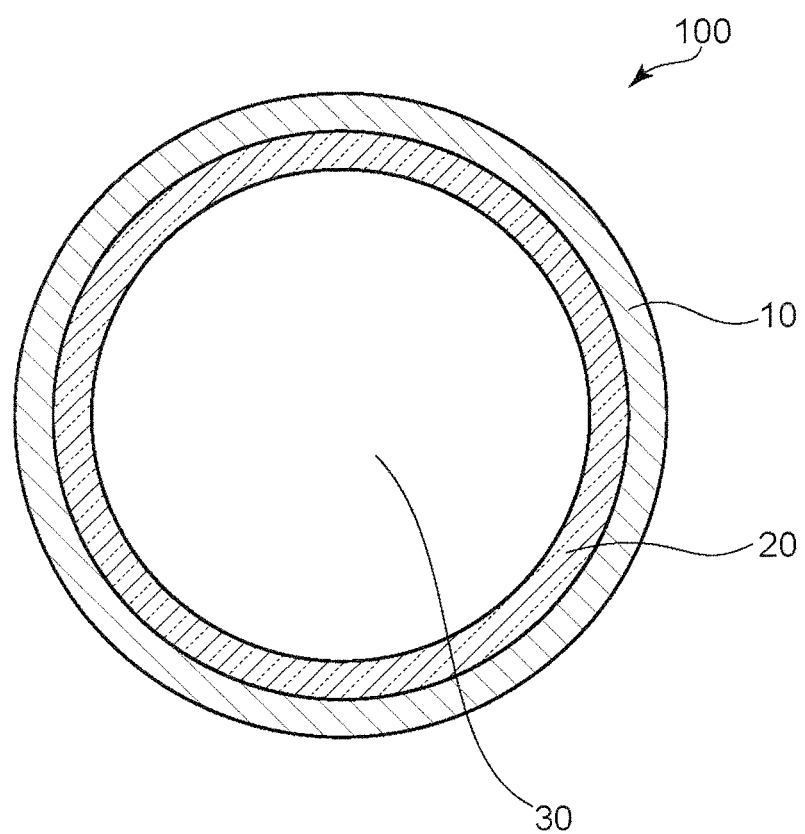
FIG. 1 is a schematic sectional view of a tubular member for an exhaust gas treatment device according to at least one embodiment of the present invention in a direction orthogonal to a flow path direction of an exhaust gas.

A-1. Overall Configuration of Tubular Member for Exhaust Gas Treatment Device FIG. 1 is a schematic sectional view of a tubular member for an exhaust gas treatment device according to at least one embodiment of the present invention (hereinafter sometimes simply referred to as "tubular member") in a direction orthogonal to a flow path direction of an exhaust gas. A tubular member 100 of the illustrated example includes a tubular main body 10 and an insulating layer 20 formed at least on an inner peripheral surface of the tubular main body 10. The insulating layer may be formed only on the inner peripheral surface of the tubular main body as in the illustrated example, or may be formed on both the inner peripheral surface and an outer peripheral surface of the tubular main body although not shown. When the insulating layer is formed on both the inner peripheral surface and the outer peripheral surface of the tubular main body, the risk of electric leakage caused by unburnt deposits that may be accumulated in the vicinity of an end portion on an upstream side of an electric heating catalyst support can be suppressed.

In at least one embodiment of the present invention, the insulating layer 20 contains glass containing a crystalline substance and has a porosity of from 1% to 12%. With such configuration, an insulating layer, which has excellent adhesiveness to the tubular main body, which can maintain an insulating function without being softened and deformed even under high temperature, and in which the occurrence of cracking is suppressed even under high temperature, can be achieved. As a result, a tubular member for an exhaust gas treatment device that can stably maintain an exhaust gas treatment (typically, purification) function even under high temperature can be achieved.

The tubular member 100 has a cavity (hollow portion) 30 defined in a center portion in a cross-section in a direction orthogonal to the flow path direction of the exhaust gas. The electric heating catalyst support is accommodated in the cavity 30 to form an exhaust gas treatment device. The tubular member 100 of the illustrated example has a cylindrical shape (the sectional shape in the direction orthogonal to the flow path direction of the exhaust gas is circular), but the shape of the tubular member may be appropriately designed in accordance with purposes. For example, the tubular member 100 may have a tubular shape in which the cross-section has a polygonal shape (e.g., a quadrangular shape, a hexagonal shape, or an octagonal shape) or an elliptical shape. The tubular main body and the insulating layer are specifically described below. Details of the electric heating catalyst support and the exhaust gas treatment device are described later in the section B.

A-2. Tubular Main Body

The tubular main body 10 is typically made of a metal. With such configuration, production efficiency is excellent, and the electric heating catalyst support can be easily accommodated or attached. As a material for forming the tubular main body 10, there are given, for example, stainless steel, a titanium alloy, a copper alloy, an aluminum alloy, and brass. Of those, stainless steel is preferred because of high durability and reliability, and low cost.

In at least one embodiment, the tubular main body contains chromium. Chromium may be typically introduced in order to impart corrosion resistance to the tubular main body (e.g., stainless steel). The content of chromium in the tubular main body may be, for example, 10.5 mass % or more, and may be, for example, from 12 mass % to 20 mass %. Even when the tubular main body contains chromium, the generation of an environmentally hazardous substance under high temperature can be suppressed satisfactorily by optimizing the glass composition of the insulating layer described later, specifically by setting the content of an alkali metal element in the glass to 1,000 ppm or less.

The thickness of the tubular main body may be, for example, from 0.1 mm to 10 mm, may be, for example, from 0.3 mm to 5 mm, and may be, for example, from 0.5 mm to 3 mm. When the thickness of the tubular main body falls within such ranges, the tubular main body may be excellent in durability and reliability.

The length of the tubular main body may be appropriately set in accordance with purposes, the length of the electric heating catalyst support, and the like. The length of the tubular main body may be, for example, from 30 mm to 600 mm, may be, for example, from 40 mm to 500 mm, and may be, for example, from 50 mm to 400 mm. The length of the tubular main body is preferably larger than the length of the electric heating catalyst support. In this case, the electric heating catalyst support may be arranged so that the electric heating catalyst support is not exposed from the tubular main body.

The inner peripheral surface of the tubular main body may be subjected to surface treatment as required. A typical example of the surface treatment is roughening treatment, such as blasting. Through the roughening treatment, adhesiveness between the insulating layer to be obtained and the tubular main body can be improved.

The tubular main body may have a double structure including an outer tubular portion and an inner tubular portion arranged coaxially (not shown). In this case, the insulating layer may be formed between the outer tubular portion and the inner tubular portion (on an inner peripheral surface of the outer tubular portion or on an outer peripheral surface of the inner tubular portion), on an inner peripheral surface of the inner tubular portion, or both.

A-3. Insulating Layer

The insulating layer 20 imparts an electrical insulating property between the tubular member 100 and the electric heating catalyst support (described later). Herein, the electrical insulating property typically satisfies JIS standard D5305-3 from the viewpoint of suppressing electric leakage to a surrounding exhaust pipe, and an insulation resistance value per unit voltage is, for example, 100 Ω/V or more. The insulating layer 20 preferably further has moisture impermeability and moisture non-absorbability. That is, the insulating layer 20 may be configured to be so dense as to prevent the permeation and absorption of water.

In at least one embodiment of the present invention, the insulating layer 20 contains glass containing a crystalline substance as described above. When the glass contains a crystalline substance, an insulating layer that is difficult to soften and deform even under high temperature (e.g., 750° C. or more) can be formed. The insulating layer can maintain a pressure of 0.1 MPa, which is understood to be required for holding an electric heating catalyst support when the electric heating catalyst support is accommodated, for example, under an environment of 750° C. or more. Accordingly, in the exhaust gas treatment device, the displacement of the electric heating catalyst support, the movement thereof to an undesired position, and the like can be suppressed. As a result, a tubular member for an exhaust gas treatment device that can stably maintain an exhaust gas treatment (typically, purification) function even under high temperature can be achieved. Further, when the glass contains a crystalline substance, an insulating layer having excellent adhesiveness to the tubular main body can be formed. This is because a difference in thermal expansion coefficient from the metal (tubular main body) can be reduced, and a thermal stress generated during heating can be reduced. The presence or absence of a crystalline substance (crystal) may be recognized by an X-ray diffraction method.

In at least one embodiment of the present invention, the insulating layer 20 has a porosity of from 1% to 12% as described above. When the porosity of the insulating layer is controlled within such range, an insulating layer, which can maintain an insulating function without being softened and deformed even under high temperature, and in which the occurrence of cracking is suppressed even under high temperature, can be achieved. As a result, a tubular member for an exhaust gas treatment device that can stably maintain an exhaust gas treatment (typically, purification) function even under high temperature can be achieved. The porosity of the insulating layer may be, for example, from 1% to 10%, may be, for example, from 2% to 9%, and may be, for example, from 3% to 8%. The porosity of the insulating layer may also be, for example, from 1% to 7%, may also be, for example, from 1% to 5%, may also be, for example, from 1% to 4%, and may also be, for example, from 2% to 4%. When the porosity of the insulating layer falls within such ranges, the occurrence of cracking under high temperature can be more satisfactorily suppressed. Further, the insulating layer can be made extremely dense, and thus, significantly excellent moisture impermeability and moisture non-absorbability can be achieved. When the porosity is too small, the Young's modulus becomes too large, with the result that cracking may be caused by a thermal stress. When the porosity is too large, the strength becomes insufficient, with the result that cracking may be caused by such insufficient strength. The porosity may be determined, for example, by photographing a cross-section of the insulating layer with a scanning electron microscope (SEM) and processing and analyzing the obtained image.

The porosity of the insulating layer 20 in a range of from the interface between the insulating layer 20 and the tubular main body 10 to 50 μm of the insulating layer 20 (hereinafter sometimes referred to as "surface porosity") is preferably from 1% to 6%, more preferably from 1% to 5%, still more preferably from 1% to 4%. Either when the surface porosity is too large or too small, cracking may occur in the insulating layer under high temperature. Further, when the surface porosity is too large, the insulating layer may be peeled from the tubular main body. The insulating layer and the tubular main body have different thermal expansion coefficients, and hence a stress is liable to occur at the interface therebetween. Accordingly, when the surface porosity (the porosity of the vicinity of the interface) is set to be smaller than the porosity of each of the other portions of the insulating layer or the entire insulating layer, the occurrence of cracking under high temperature can be more satisfactorily suppressed.

Figure 2:
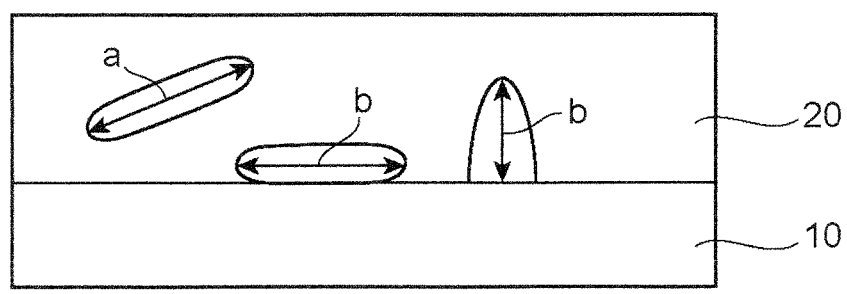
FIG. 2 is a conceptual diagram for illustrating a maximum pore size in an insulating layer of the tubular member for an exhaust gas treatment device according to at least one embodiment of the present invention.

In the insulating layer 20, the maximum size of a pore that is not brought into contact with the interface between the insulating layer 20 and the tubular main body 10 is preferably 50 μm or less, more preferably 40 μm or less, still more preferably 30 μm or less, particularly preferably 20 μm or less. It is preferred that the maximum size of the pore that is not brought into contact with the interface be smaller. The minimum value of the maximum size of the pore that is not brought into contact with the interface may be, for example, 1 μm. When the maximum size of the pore that is not brought into contact with the interface falls within such ranges, the occurrence of cracking under high temperature can be more satisfactorily suppressed. When the maximum size of the pore that is not brought into contact with the interface is too large, the strength becomes locally insufficient, with the result that cracking may be caused by such insufficient strength. The maximum size of the pore that is not brought into contact with the interface is defined as the size of a pore in which the size (long axis diameter) represented by "a" of FIG. 2 is maximum, among pores which are present in an image obtained by photographing a cross-section of the insulating layer with the SEM and which are not brought into contact with the interface.

In the insulating layer 20, the maximum size of a pore that is brought into contact with the interface between the insulating layer 20 and the tubular main body 10 is preferably 30 μm or less, more preferably 25 μm or less, still more preferably 20 μm or less, particularly preferably 15 μm or less. It is preferred that the maximum size of the pore that is brought into contact with the interface be smaller. The minimum value of the maximum size of the pore that is brought into contact with the interface may be, for example, 0.3 μm. When the maximum size of the pore that is brought into contact with the interface falls within such ranges, the occurrence of cracking under high temperature can be more satisfactorily suppressed. The insulating layer and the tubular main body have different thermal expansion coefficients, and hence a stress is liable to occur at the interface therebetween. Accordingly, when the maximum size of the pore that is brought into contact with the interface is set to be smaller than the maximum size of the pore that is not brought into contact with the interface, the occurrence of cracking under high temperature can be more satisfactorily suppressed. The maximum size of the pore that is brought into contact with the interface is defined as the size of a pore in which the size (long axis diameter) represented by "b" of FIG. 2 is maximum, among pores which are present in an image obtained by photographing a cross-section of the insulating layer with the SEM and which are brought into contact with the interface.

The thickness of the insulating layer is preferably from 30 μm to 800 μm, more preferably from 50 μm to 800 μm, still more preferably from 50 μm to 600 μm, particularly preferably from 100 μm to 550 μm. When the thickness of the insulating layer falls within such ranges, both an excellent electrical insulating property and excellent adhesiveness to the tubular main body can be achieved.

In at least one embodiment, the insulating layer 20 may include a relatively dense first layer formed on a tubular main body side and a relatively sparse second layer formed on an opposite side to the tubular main body (not shown). Such configuration is preferred when the thickness of the insulating layer is more than 150 μm. This is because it may be difficult to set the thickness of the relatively dense first layer to more than 150 μm. When the thickness of the insulating layer is 150 μm or less, the insulating layer may be a single layer of the first layer, or may include the first layer and the second layer in the order from the tubular main body side. The thickness of the first layer is preferably 150 μm or less as described above, more preferably from 30 μm to 120 μm, still more preferably from 40 μm to 100 μm. The porosity of the first layer is preferably from 1% to 6%, more preferably from 1% to 5%. The thickness of the second layer is obtained by subtracting the thickness of the first layer from the thickness of the insulating layer. Thus, the thickness of the second layer may be set in accordance with a desired thickness of the insulating layer and a desired thickness of the first layer. The thickness of the second layer may be, for example, from 0 μm to 650 μm, and may be, for example from 100 μm to 500 μm. The porosity of the second layer is preferably from 6% to 12%, more preferably from 6% to 9%. When the insulating layer is formed so as to have a two-layer structure, an insulating layer in which the occurrence of cracking under high temperature and the peeling from the tubular main body are suppressed can be achieved.

The glass typically contains silicon, boron, and magnesium. With such configuration, flowability at the time of insulating layer formation is excellent, and a predetermined crystal can be formed. Accordingly, a uniform insulating layer can be formed, and an insulating layer that is difficult to soften and deform even under high temperature (e.g., 750° C. or more) can be formed. Silicon may be contained in the glass, for example, in the form of $SiO_2$. Boron may be contained in the glass, for example, in the form of $B_2O_3$. Magnesium may be contained in the glass, for example, in the form of MgO. In other words, the glass may be, for example, $SiO_2$—$B_2O_3$—MgO-based glass.

Silicon (substantially, $SiO_2$) is a component for forming the skeleton of the glass. More specifically, silicon is a component for precipitating a crystal by heat treatment, and is also a component for widening a vitrification range to facilitate vitrification and improving water resistance and heat resistance. The content of silicon in the glass is preferably 50 mol % or less, more preferably 30 mol % or less, still more preferably from 5 mol % to 20 mol %, particularly preferably from 10 mol % to mol %. Boron (substantially, $B_2O_3$) is a component for enhancing devitrification resistance as well as meltability and flowability. The content of boron is preferably from 5 mol % to 60 mol %, more preferably from 20 mol % to 40 mol %, still more preferably from 25 mol % to 37 mol %, particularly preferably from mol % to 35 mol %. Magnesium (substantially, MgO) is a constituent component of a crystal, and is also a component for lowering high-temperature viscosity to enhance meltability and flowability. When the glass contains magnesium, an insulating layer which is difficult to soften and deform even under high temperature and which is uniform can be formed. The content of magnesium in the glass is preferably 10 mol % or more, more preferably from 15 mol % to 55 mol %, still more preferably from 25 mol % to 52 mold. When the contents of silicon, boron, and magnesium fall within such ranges, the above-mentioned effect (formation of an insulating layer which is uniform and which is difficult to soften and deform even under high temperature) becomes more remarkable. As used herein, the "content of an element in the glass" is a molar ratio of an atom of the element when the amount of all the atoms in the glass excluding an oxygen atom is set to 100 mol %. The amount of an atom of each element in the glass may be measured, for example, by inductively coupled plasma (ICP) emission spectrometry.

The glass may further contain barium. In this case, the glass may further contain lanthanum, zinc, or a combination thereof. Barium may be contained in the glass, for example, in the form of BaO. Lanthanum may be contained in the glass, for example, in the form of $La_2O_3$. Zinc may be contained in the glass, for example, in the form of ZnO. Barium (substantially, BaO) and zinc (substantially, ZnO) are each a constituent component of a crystal. Lanthanum (substantially, $La_2O_3$) is a component for improving flowability. When the glass contains barium, and further, lanthanum, zinc, or a combination thereof as required, an insulating layer having extremely excellent adhesiveness to the tubular main body can be formed. When barium is contained in the glass, the content thereof is preferably from 2 mol % to 20 mol %. The content of barium may be, for example, from 2 mol % to 6 mol %, and may be, for example, from 6 mol % to 18 mol %. The content of lanthanum is preferably from 2 mol % to 20 mol %, more preferably from 2 mol % to 17 mol %. The content of zinc is preferably from 2 mol % to 10 mol %, more preferably from 3 mol % to 8 mol %. The total content of lanthanum and zinc may be, for example, from 4 mol % to 20 mol %, and may be, for example, from 8 mol % to 20 mol %.

The glass may further contain other metal elements. Examples of such metal elements include aluminum, calcium, and strontium. Those metal elements may be contained in the glass alone or in combination thereof. The other metal elements may also be contained in the glass in the form of metal oxides (e.g., $Al_2O_3$, CaO, and SrO) as with the above-mentioned elements. The contents of those metal elements in the glass may be defined as the balance obtained by excluding the above-mentioned elements and inevitable impurities. Aluminum (substantially, $Al_2O_3$) is a component for forming the skeleton of the glass, increasing the strain point thereof, adjusting the viscosity thereof, and suppressing the phase separation thereof. Calcium (substantially, CaO) is a component for widening a vitrification range to facilitate vitrification, and is also a component for lowering high-temperature viscosity to enhance meltability and flowability without decreasing the strain point. Strontium (substantially, SrO) is a component for widening the vitrification range to facilitate vitrification, and is also a component for suppressing the phase separation and enhancing devitrification resistance. The content of aluminum may be, for example, from 5 mol % to 15 mol %, and may be, for example, from 5 mol % to 10 mol %. In addition, the content of calcium may be, for example, from 3 mol % to 7 mol %. The content of strontium may be, for example, from 8 mol % to 12 mol %.

In at least one embodiment, the content of an alkali metal element in the glass may be, for example, 1,000 ppm or less. That is, the glass may be so-called alkali-free glass. The content of the alkali metal element is preferably 800 ppm or less, more preferably 500 ppm or less, still more preferably 200 ppm or less, particularly preferably 100 ppm or less. It is preferred that the content of the alkali metal element be smaller, and the content may be, for example, substantially zero (less than a detection limit). When the content of the alkali metal element in the glass is extremely small, a tubular member for an exhaust gas treatment device capable of suppressing the generation of an environmentally hazardous substance even under high temperature can be achieved. As used herein, the "content of an alkali metal element in the glass" means the total amount of alkali metal elements contained in the glass. Examples of the alkali metal include lithium, sodium, potassium, rubidium, cesium, and francium. The alkali metal element in the glass may be, for example: sodium, potassium, or a combination thereof; or sodium. The content of the alkali metal element may be measured, for example, by inductively coupled plasma (ICP) emission spectroscopy.

The softening temperature of the insulating layer is preferably 600° C. or more, more preferably 750° C. or more, still more preferably 800° C. or more, particularly preferably 850° C. or more. The upper limit of the softening temperature may be, for example, 1,200° C. When the softening temperature of the insulating layer falls within such ranges, an insulating layer that is difficult to soften even under high temperature (e.g., 750° C. or more) can be formed. The softening temperature is a temperature at which the insulating layer is deformed by 10% with respect to the thickness of the insulating layer in the thickness direction of the insulating layer when the insulating layer is heated at a temperature increase rate of 10° C./min from normal temperature (25° C.) while being pressed at a pressure of 0.1 MPa through use of an alumina needle of 1 mmΦ.

In at least one embodiment, the insulating layer satisfies the below-indicated item (1) and/or (2) after a predetermined peeling test:

(1) an element derived from the insulating layer is present on the inner peripheral surface of the tubular main body; and/or (2) an element derived from the tubular main body is present in the insulating layer.

The peeling test involves repeating, until the insulating layer is peeled, an operation of placing a tubular member for an exhaust gas treatment device alternately in an environment of 900° C. and an environment of 150° C. in accordance with JIS H 8451:2008. With such configuration, excellent adhesiveness between the tubular main body and the insulating layer can be achieved. From the above-mentioned item (1) or (2), it is inferred that an intermediate layer is formed at an interface between the tubular main body 10 and the insulating layer 20. The intermediate layer may be typically a compatible layer in which the constituent component of the tubular main body and the constituent component of the insulating layer are mixed. The intermediate layer may be formed, for example, when the constituent component of the tubular main body migrates to the insulating layer and the constituent component of the insulating layer migrates to the tubular main body. In some cases, the intermediate layer may contain a chemical reaction product of the constituent component of the tubular main body and the constituent component of the insulating layer. The intermediate layer may have a concentration gradient in which the constituent component of the tubular main body is decreased from a tubular main body side toward an insulating layer side, and/or the constituent component of the insulating layer is decreased from the insulating layer side toward the tubular main body side. When such intermediate layer is formed, the interface between the tubular main body and the insulating layer becomes unclear, and it is inferred that the adhesiveness is improved. However, such inference does not constrain any embodiment of the invention of the present application and the mechanism thereof. Such insulating layer can be achieved, for example, by introducing barium, and lanthanum, zinc, or a combination thereof as required.

The insulating layer may be formed as part (constituent element) of the tubular member for an exhaust gas treatment device as described above, or may be provided in a form capable of being distributed as an insulating layer. When the insulating layer is formed as part of the tubular member for an exhaust gas treatment device, the insulating layer may be typically formed by applying a material for forming the insulating layer to the tubular main body and drying and firing the material. A method of forming the insulating layer is described later in the section A-4. Examples of the form capable of being distributed as an insulating layer include a laminate in which an insulating layer is formed on any appropriate base material, a glass sheet of an insulating layer, and a glass roll of an insulating layer. Any of those may be attached to the tubular main body by any appropriate method. Specific examples of the attachment include bonding via an adhesive or the like and mechanical fixing.

A-4. Method of Forming Insulating Layer

The insulating layer may be formed by any appropriate method. The insulating layer is typically formed by applying and drying a slurry (dispersion) containing a glass source to form a coating film, and firing the coating film. The slurry may contain a raw material or a glass frit as the glass source. Now, as a typical example, a method of forming an insulating layer through use of a slurry containing a glass frit as the glass source is described.

The forming method according to at least one embodiment typically includes: producing a glass frit from a glass source (raw material); preparing a slurry containing the glass frit; forming a coating film of the slurry; and firing the coating film to form an insulating layer containing glass.

Specific examples of the raw material include silica sand (silicon source), dolomite (magnesium and calcium source), alumina (aluminum source), barium oxide, lanthanum oxide, zinc oxide (zinc flower), and strontium oxide. The raw material is not limited to an oxide, and may also be, for example, a carbonate or a hydroxide. The glass frit is typically produced by synthesizing glass from a raw material for glass and pulverizing the obtained glass (e.g., pulverizing the obtained glass in two stages of coarse pulverization and fine pulverization). When the glass is synthesized, melting under high temperature (typically, 1,200° C. or more) for a long period of time is performed.

The slurry (dispersion) is prepared by mixing the above-mentioned glass frit and a solvent. The solvent may be water or an organic solvent. The solvent is preferably water or a water-soluble organic solvent, and is more preferably water. The solvent may be mixed at a ratio of preferably from 50 parts by mass to 300 parts by mass, more preferably 80 parts by mass to 200 parts by mass with respect to 100 parts by mass of the glass frit. When the slurry is prepared, a slurry aid (e.g., a resin, a plasticizer, a dispersant, a thickener, or various additives) may be further mixed. The kind, number, combination, blending amount, and the like of the slurry aid may be appropriately set depending on purposes. As used herein, the "solvent" refers to a liquid medium contained in the slurry, and has a concept encompassing a solvent and a dispersion medium.

Next, the slurry is applied and dried to form a coating film. The coating film may be formed on the inner peripheral surface of the tubular main body or may be formed on any appropriate base material. As an application method, any appropriate method may be used. Specific examples of the application method include spraying, dipping under the condition of masking portions other than a portion of the tubular main body or the base material in which the insulating layer is to be formed, and bar coating. An application thickness may be adjusted in accordance with the above-mentioned desired thickness of the insulating layer. A drying temperature is, for example, from 40° C. to 120° C., and is, for example, from 50° C. to 110° C. A drying time is, for example, from 1 minute to 60 minutes, and is, for example, from 10 minutes to 30 minutes.

Finally, the coating film is fired to form an insulating layer. A firing temperature is preferably 1,100° C. or less, more preferably from 600° C. to 1,100° C., still more preferably from 700° C. to 1,050° C. A firing time is, for example, from 5 minutes to 30 minutes, and is, for example, from 8 minutes to 15 minutes.

As described above, the insulating layer may be formed. When the insulating layer is to be formed on both the inner peripheral surface and the outer peripheral surface of the tubular main body, the insulating layer may be formed also on the outer peripheral surface in the same manner as described above.

In this embodiment, the porosity and the maximum size of the pore of an insulating layer to be obtained can be controlled by adjusting the average particle diameter (e.g., a median diameter) of a glass frit. For example, when a coating film is formed through use of a glass frit having a median diameter of 45 μm or less, an insulating layer in which the porosity is from 1% to 12% and the maximum size of the pore that is not brought into contact with the interface is 50 μm or less can be formed. In this case, the median diameter is preferably 40 μm or less, more preferably 35 μm or less, still more preferably 30 μm or less. The minimum value of the median diameter may be, for example, 3 μm. In addition, for example, when a fine particle layer (coating film) having a thickness of from 20 μm to 300 μm is formed through use of a glass frit having a median diameter of from 1 μm to 10 μm, an insulating layer in which the porosity is from 1% to 6% and the maximum size of the pore that is brought into contact with the interface is 30 μm or less can be formed. In addition, for example, a coarse particle layer (coating film) may be formed on the surface of the fine particle layer in accordance with the thickness of the fine particle layer and the thickness desired in an insulating layer to be obtained. For example, the coarse particle layer may be formed through use of a glass frit having a median diameter of from 11 μm to 45 μm. When the insulating layer is a single layer, the fine particle layer typically serves as an insulating layer. When the insulating layer has a two-layer structure of the relatively dense first layer and the relatively sparse second layer, the fine particle layer and the coarse particle layer typically serve as the first layer and the second layer, respectively. The thickness of each of the fine particle layer and the coarse particle layer may become about a half through firing, and hence it is only required that the thickness of each of the fine particle layer and the coarse particle layer be set to about twice the thickness desired in the insulating layer (first layer and second layer when the insulating layer has a two-layer structure).

B. Exhaust Gas Treatment Device

Figure 3:
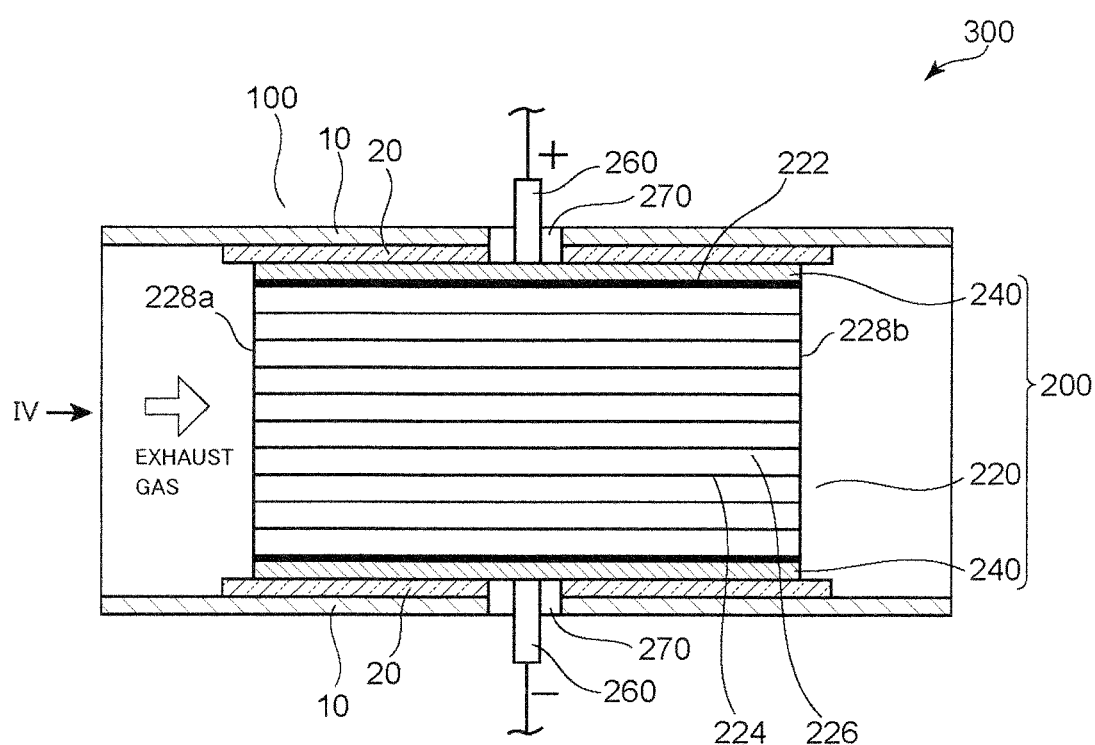
FIG. 3 is a schematic sectional view of an exhaust gas treatment device according to at least one embodiment of the present invention in a direction parallel to the flow path direction of the exhaust gas.
Figure 4:
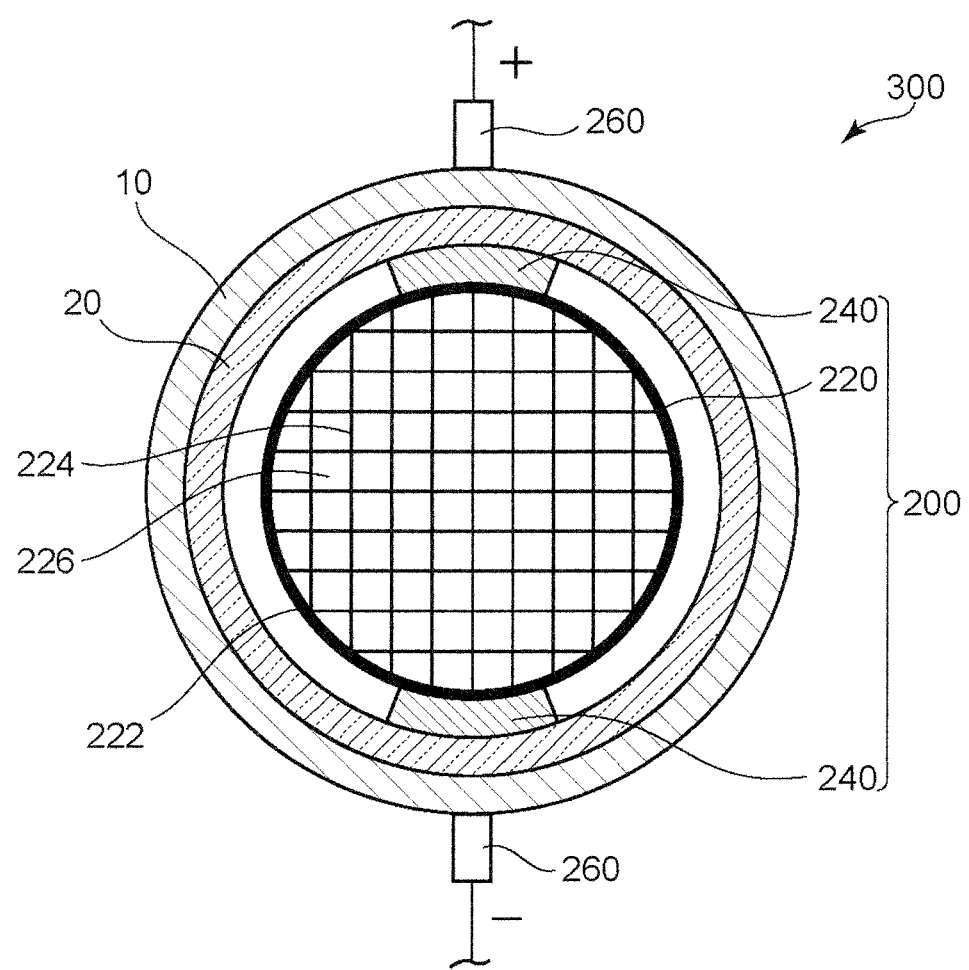
FIG. 4 is a schematic sectional view (schematic sectional view when viewed from a direction of the arrow IV of FIG. 3) of the exhaust gas treatment device of FIG. 3 in a direction orthogonal to the flow path direction of the exhaust gas.

FIG. 3 is a schematic sectional view of an exhaust gas treatment device according to at least one embodiment of the present invention in a direction parallel to the flow path direction of the exhaust gas. FIG. 4 is a schematic sectional view of the exhaust gas treatment device of FIG. 3 when viewed from a direction of the arrow IV. An exhaust gas treatment device 300 of the illustrated example includes an electric heating catalyst support (hereinafter sometimes simply referred to as "catalyst support") 200 capable of heating the exhaust gas and the tubular member 100 for accommodating the catalyst support 200. The tubular member 100 is the tubular member for an exhaust gas treatment device according to at least one embodiment of the present invention described in the section A and FIG. 1. The exhaust gas treatment device is installed in the middle of an exhaust gas flow path for allowing the exhaust gas to flow from an engine. When the catalyst support heated to the activating temperature of a catalyst and the exhaust gas are brought into contact with each other, CO, NO$_x$, a hydrocarbon, and the like in the exhaust gas passing through the catalyst support can be formed into harmless substances by a catalytic reaction.

The catalyst support 200 may have a shape corresponding to the shape of the tubular member 100. For example, when the tubular member 100 has a cylindrical shape, the catalyst support 200 may have a columnar shape. The catalyst support 200 is typically accommodated coaxially in the cavity 30 of the tubular member 100. The catalyst support may be accommodated directly in the tubular member (that is, without other members), or may be accommodated, for example, through intermediation of a holding mat (not shown). When the catalyst support is accommodated directly in the tubular member, the catalyst support may be fitted, for example, to the tubular member. The holding mat is typically an insulating material (e.g., alumina fibers) formed into a mat shape. The holding mat typically covers the outer peripheral surface of the catalyst support over the entire circumference, and the tubular member can hold the catalyst support through intermediation of the holding mat.

The catalyst support 200 includes a honeycomb structure portion 220 and a pair of electrode portions 240 arranged on a side of the honeycomb structure portion 220 (typically so as to be opposed to each other across a central axis of the honeycomb structure portion 220). The honeycomb structure portion 220 includes an outer peripheral wall 222 and partition walls 224 which are arranged on an inner side of the outer peripheral wall 222 and which define a plurality of cells 226 extending from a first end surface 228a to a second end surface 228b to form the exhaust gas flow path. The outer peripheral wall 222 and the partition walls 224 are typically formed of conductive ceramics. The pair of electrode portions 240 and 240 are provided with metal terminals 260 and 260, respectively. One metal terminal is connected to a positive electrode of a power supply (e.g., a battery), and the other metal terminal is connected to a negative electrode of the power supply (e.g., a battery). On the periphery of the metal terminals 260 and 260, covers 270 and 270 each made of an insulating material are arranged so as to insulate the tubular main body 10 and the insulating layer 20 from the metal terminals.

The catalyst is typically supported by the partition walls 224. When the catalyst is supported by the partition walls 224, CO, NO$_x$, a hydrocarbon, and the like in the exhaust gas passing through the cells 226 can be formed into harmless substances by the catalytic reaction. The catalyst may preferably contain a noble metal (e.g., platinum, rhodium, palladium, ruthenium, indium, silver, or gold), aluminum, nickel, zirconium, titanium, cerium, cobalt, manganese, zinc, copper, tin, iron, niobium, magnesium, lanthanum, samarium, bismuth, barium, and a combination thereof. The supported amount of the catalyst may be, for example, from 0.1 g/L to 400 g/L.

When a voltage is applied to the honeycomb structure portion 220, the honeycomb structure portion 220 can be energized to generate heat with Joule heat. Thus, the catalyst supported by the honeycomb structure portion (substantially, the partition walls) can be heated to the activating temperature before starting the engine or at the time of starting the engine. As a result, the exhaust gas can be sufficiently treated (typically, purified) even at the time of starting the engine.

Regarding the catalyst support, a configuration well known in the art may be adopted, and hence detailed description thereof is omitted.

EXAMPLES

Now, the present invention is specifically described by way of Examples. However, the present invention is not limited by these Examples. Evaluation items in Examples are as described below.

(1) Porosity

A cross-section of an insulating layer produced in each of Examples and Comparative Examples was photographed with a scanning electron microscope (SEM), and the porosity (entirety) of the insulating layer was determined from the obtained image through use of image processing software. In addition, the insulating layer in a range of from the interface between the insulating layer and a tubular main body to 50 μm of the insulating layer in its thickness direction was photographed with the SEM, and a porosity (interface) was determined from the obtained image through use of image processing software. Regarding an example (Example 13 described later) in which the thickness of the insulating layer did not reach 50 μm, the entire thickness of the insulating layer (same range as that of the porosity of the entire insulating layer) was targeted for measurement.

(2) Maximum Pore Size

The cross-section (600 μm (width)×500 μm (height)) of the insulating layer produced in each of Examples and Comparative Examples was photographed with the SEM in three portions at any appropriate positions, and the following maximum pore sizes were measured from the images of the three portions. Regarding the maximum size of a pore that is not brought into contact with the interface, the size of a pore in which the size represented by "a" of FIG. 2 is maximum, among pores which are present in the obtained image and are not brought into contact with the interface, is adopted as "interface non-contact maximum pore size." Regarding the maximum size of a pore that is brought into contact with the interface, the size of a pore in which the size represented by "b" of FIG. 2 is maximum, among pores which are present in the obtained image and are brought into contact with the interface, is adopted as "interface contact maximum pore size."

(3) Softening Temperature

A temperature at which the insulating layer produced in each of Examples and Comparative Examples was deformed by 10% with respect to the thickness of the insulating layer in the thickness direction of the insulating layer when the insulating layer was heated at a temperature increase rate of 10° C./min from normal temperature (25° C.) while being pressed at a pressure of 0.1 MPa through use of an alumina needle of 1 mmΦ was adopted as a softening temperature.

(4) Peeling Test

A peeling test was performed in accordance with "Testing methods for thermal cycle and thermal shock resistance of thermal barrier coatings" of JIS H 8451:2008. Specifically, for a tubular member obtained in each of Examples and Comparative Examples, an operation of placing the tubular member alternately in an environment of 900° C. and an environment of 150° C. was repeated. The presence or absence of peeling of the insulating layer was visually recognized and evaluated based on the following criteria.

○ (satisfactory): no peeling occurs even with 9 or more repetitions (evaluation is ended with 10 repetitions)

Δ (acceptable): peeling occurs with 5 to 8 repetitions

× (unsatisfactory): peeling occurs with 1 to 4 repetitions (5) Cracking

For a tubular member obtained in each of Examples and Comparative Examples, an operation of placing the tubular member alternately in an environment of 900° C. and an environment of 150° C. was repeated. The presence or absence of cracking in the insulating layer was visually recognized and evaluated based on the following criteria.

○ (satisfactory): no cracking occurs even with 9 or more repetitions (evaluation is ended with 10 repetitions)

Δ (acceptable): cracking occurs with 5 to 8 repetitions

× (unsatisfactory): cracking occurs with 1 to 4 repetitions

Example 1

The inner peripheral surface of a metal tube made of SUS430 was subjected to sandblasting treatment using #24 to #60 alumina abrasive grains. A treatment time was set to 1 minute. The surface roughness Ra of the metal tube after the sandblasting treatment was from 2.0 μm to 6.5 μm. The metal tube thus obtained was used as a tubular main body.

Meanwhile, a raw material obtained by blending predetermined amounts of silica sand (Si source), $B_2O_3$, and $Mg(OH)_2$ was melted, and the resultant was coarsely pulverized and finely pulverized to produce a glass frit. In this Example, a glass frit having a median diameter of 1 μm (fine particle raw material) and a glass frit having a median diameter of 30 μm (coarse particle raw material) were used. The median diameter of the glass frit was calculated in accordance with "Particle size analysis-Laser diffraction methods" of JIS Z8825:2013. 100 Parts by mass of water was added to 100 parts by mass of the fine particle raw material, and the resultant was subjected to wet mixing with a ball mill processor, to thereby prepare a fine particle raw material dispersion (slurry). Further, 100 parts by mass of water was added to 100 parts by mass of the coarse particle raw material, and the resultant was subjected to wet mixing with a ball mill processor, to thereby prepare a coarse particle raw material dispersion (slurry).

The fine particle raw material dispersion was applied by spraying onto the inner peripheral surface of the tubular main body obtained in the foregoing to form a coating film, followed by drying at 50° C., to thereby form a fine particle layer having a thickness of 150 μm. The coarse particle raw material dispersion was applied by spraying onto the surface of the obtained fine particle layer to form a coating film, followed by drying at 50° C., to thereby form a coarse particle layer having a thickness of 450 μm. The tubular main body having the fine particle layer and the coarse particle layer formed thereon was fired at 860° C. to form an insulating layer (thickness: 300 μm) formed of glass containing a crystalline substance. The glass composition of the obtained insulating layer was measured by inductively coupled plasma (ICP) emission spectrometry, and found to be 13 mol % of silicon, 33 mol % of boron, 50 mol % of magnesium, and 4 mol % of barium. Thus, a tubular member was produced. The obtained tubular member was subjected to the above-mentioned evaluations of (1) to (5). The results are shown in Table 1. In addition, it was determined whether an insulating layer was crystalline or amorphous by an X-ray diffraction method (XRD). In the obtained insulating layer, a diffraction peak of a crystal was observed in a diffraction line, and thus, it was recognized that the insulating layer was crystallized (crystalline).

Examples 2 to 16 and Comparative Examples 1 and 2

Each tubular member was produced in the same manner as in Example 1 except that the fine particle layer and the coarse particle layer having thicknesses shown in Table 1 were formed through use of a fine particle raw material and a coarse particle raw material shown in Table 1. The obtained tubular member was subjected to the same evaluations as those of Example 1. The results are shown in Table 1. In addition, the insulating layer of each of Examples 2 to 16 and Comparative Examples 1 and 2 was measured by an X-ray diffraction method (XRD). As a result, a diffraction peak of a crystal was observed in a diffraction line, and thus, it was recognized that the insulating layer was crystallized (crystalline).

TABLE 1

| | Median diameter/μm | | Thickness/μm | | | | | | Maximum size of pore/μm | | | | |
| --- | --- | --- | --- | --- | --- | --- | --- | --- | --- | --- | --- | --- | --- |
| | | | Before heat treatment | | | After heat treatment | Porosity/% | | Interface non-contact | Softening Interface temperature/ | | Peeling | |
| | Fine particle raw material | Coarse particle raw material | Fine particle layer | Coarse particle layer | Total | Total | Entirety | Interface | contact | contact | ° C. | test | Cracking |
| Example 1 | 1 | 30 | 150 | 450 | 600 | 300 | 5 | 1 | 40 | 2 | >850 | ○ | ○ |
| Example 2 | 5 | 30 | 150 | 450 | 600 | 300 | 7 | 2 | 40 | 10 | >850 | ○ | ○ |
| Example 3 | 10 | 30 | 150 | 450 | 600 | 300 | 9 | 6 | 40 | 30 | >850 | ○ | ○ |
| Example 4 | 10 | 45 | 150 | 450 | 600 | 300 | 12 | 6 | 50 | 30 | >850 | ○ | ○ |
| Example 5 | 15 | 30 | 150 | 450 | 600 | 300 | 11 | 10 | 40 | 35 | >850 | ○ | Δ |
| Example 6 | 1 | — | 150 | 0 | 150 | 75 | 1 | 1 | 2 | 2 | >850 | ○ | ○ |
| Example 7 | 5 | — | 150 | 0 | 150 | 75 | 2 | 2 | 10 | 10 | >850 | ○ | ○ |
| Example 8 | 5 | 11 | 150 | 450 | 600 | 300 | 5 | 2 | 30 | 10 | >850 | ○ | ○ |
| Example 9 | 5 | 45 | 150 | 450 | 600 | 300 | 9 | 2 | 50 | 10 | >850 | ○ | ○ |
| Example 10 | 5 | 30 | 10 | 590 | 600 | 300 | 11 | 4 | 40 | 40 | >850 | ○ | Δ |
| Example 11 | 5 | 30 | 20 | 580 | 600 | 300 | 9 | 3 | 40 | 10 | >850 | ○ | ○ |
| Example 12 | 5 | 30 | 300 | 300 | 600 | 300 | 5 | 2 | 40 | 10 | >850 | ○ | ○ |
| Example 13 | 5 | — | 60 | 0 | 60 | 30 | 2 | 2 | 10 | 10 | >850 | ○ | ○ |
| Example 14 | 5 | 30 | 60 | 540 | 600 | 300 | 8 | 3 | 40 | 10 | >850 | ○ | ○ |
| Example 15 | 5 | 30 | 60 | 1,140 | 1,200 | 600 | 9 | 3 | 40 | 10 | >850 | ○ | ○ |
| Example 16 | 5 | 30 | 60 | 1,540 | 1,600 | 800 | 11 | 3 | 40 | 10 | >850 | ○ | ○ |
| Comparative Example 1 | 0.1 | 11 | 150 | 450 | 600 | 300 | 0.8 | 0.3 | 30 | 0.5 | >850 | ○ | x |
| Comparative Example 2 | 5 | 60 | 150 | 450 | 600 | 300 | 15 | 2 | 70 | 10 | >850 | ○ | x |

As is apparent from Table 1, in the tubular member of each of Examples of the present invention, an insulating layer which can maintain an insulating function without being softened even under high temperature and in which cracking does not occur even after a thermal cycle durability test is formed. Accordingly, it is understood that the tubular member of each of Examples can achieve a tubular member for an exhaust gas treatment device that can stably maintain an exhaust gas treatment (typically, purification) function even under high temperature when accommodating an electric heating catalyst support.

The tubular member for an exhaust gas treatment device according to at least one embodiment of the present invention may be suitably used for the application of the treatment (purification) of an exhaust gas from an automobile.

According to at least one embodiment of the present invention, in the tubular member for an exhaust gas treatment device including the insulating layer at least on the inner peripheral surface of the tubular main body, the insulating layer has excellent adhesiveness to the tubular main body, and can maintain an insulating function without being softened and deformed even under high temperature, and the occurrence of cracking in the insulating layer is suppressed even under high temperature. As a result, the tubular member for an exhaust gas treatment device that can stably maintain an exhaust gas treatment (typically, purification) function even under high temperature can be achieved.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A tubular member for an exhaust gas treatment device, comprising:
   a tubular main body made of a metal; and
   an insulating layer formed at least on an inner peripheral surface of the tubular main body,
   wherein the insulating layer contains glass containing a crystalline substance, and
   wherein the insulating layer has a porosity of from 1% to 12%.

2. The tubular member for an exhaust gas treatment device according to claim 1, wherein the insulating layer contains a pore, which is prevented from being brought into contact with an interface between the insulating layer and the tubular main body, and which has a maximum size of 50 μm or less.

3. The tubular member for an exhaust gas treatment device according to claim 1, wherein the insulating layer has a porosity of from 1% to 6% in a range of from the interface between the insulating layer and the tubular main body to 50 μm of the insulating layer.

4. The tubular member for an exhaust gas treatment device according to claim 1, wherein the insulating layer contains a pore, which is brought into contact with an interface between the insulating layer and the tubular main body, and which has a maximum size of 30 μm or less.

5. The tubular member for an exhaust gas treatment device according to claim 1, wherein the glass contains silicon, boron, and magnesium.

6. The tubular member for an exhaust gas treatment device according to claim 1, wherein the insulating layer has a thickness of from 50 μm to 800 μm.

7. An exhaust gas treatment device, comprising:
   an electric heating catalyst support capable of heating an exhaust gas; and
   the tubular member for an exhaust gas treatment device of claim 1 configured to accommodate the electric heating catalyst support.

8. A method of manufacturing a tubular member for an exhaust gas treatment device including a tubular main body made of a metal and an insulating layer formed at least on an inner peripheral surface of the tubular main body, the method comprising:
preparing a tubular main body; and
forming an insulating layer on an inner peripheral surface of the tubular main body,
wherein the insulating layer contains glass containing a crystalline substance, and
wherein the insulating layer has a porosity of from 1% to 12%.

9. A tubular member for an exhaust gas treatment device, comprising:
a tubular main body made of a metal; and
an insulating layer formed at least on an inner peripheral surface of the tubular main body,
wherein the insulating layer contains glass containing a crystalline substance and containing silicon, boron, and magnesium,
wherein the insulating layer has a porosity of from 1% to 12%, and has a porosity of from 1% to 6% in a range of from the interface between the insulating layer and the tubular main body to 50 μm of the insulating layer,
wherein the insulating layer contains a pore, which is prevented from being brought into contact with an interface between the insulating layer and the tubular main body, and which has a maximum size of 50 μm or less; and a pore, which is brought into contact with an interface between the insulating layer and the tubular main body, and which has a maximum size of 30 μm or less, and
wherein the insulating layer has a softening temperature of 850° C. or more.

10. The tubular member for an exhaust gas treatment device according to claim 9, wherein the insulating layer has a porosity of from 5% to 12%, and has a porosity of from 1% to 6% in a range of from the interface between the insulating layer and the tubular main body to 50 μm of the insulating layer.

11. The tubular member for an exhaust gas treatment device according to claim 9, wherein the glass has a content of silicon of from 5 mol % to 20 mol %, a content of boron of from 20 mol % to 40 mol %, and a content of magnesium of from 15 mol % to 55 mol %.

12. The tubular member for an exhaust gas treatment device according to claim 11, wherein the glass further contains barium.

13. The tubular member for an exhaust gas treatment device according to claim 9, wherein the insulating layer has a thickness of from 50 μm to 800 μm.

* * * * *